March 31, 1959        A. FLACK        2,879,917
NESTABLE PLASTIC CONTAINERS
Filed May 18, 1956
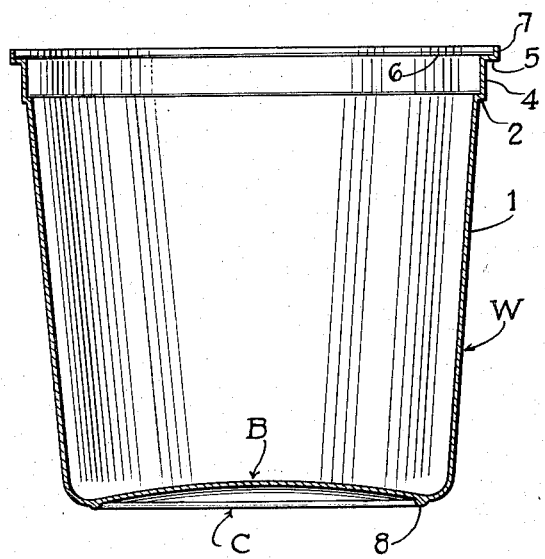
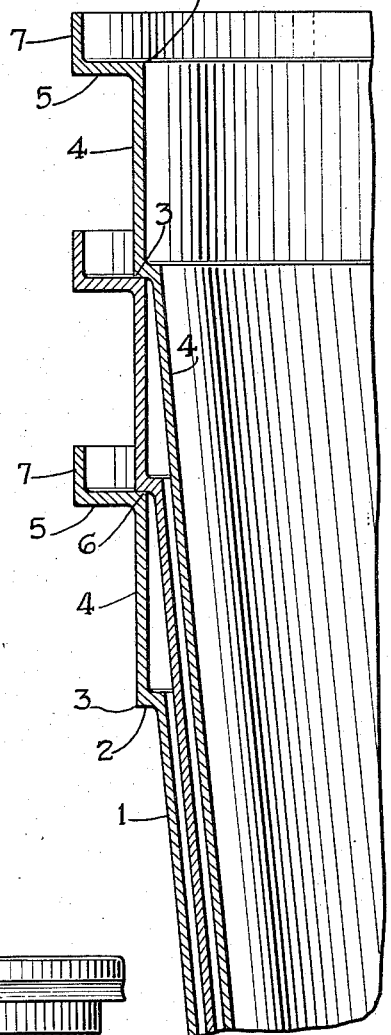
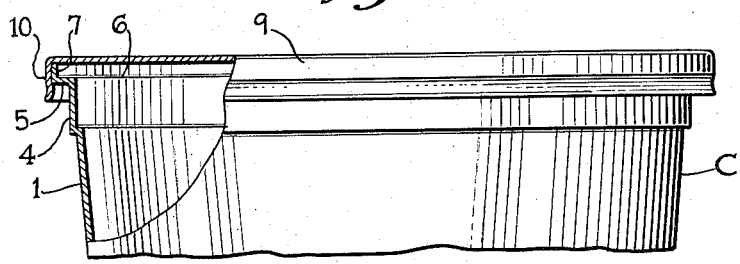
INVENTOR.
ALFRED FLACK.
BY
*his* ATTORNEYS.

United States Patent Office 2,879,917
Patented Mar. 31, 1959

2,879,917

NESTABLE PLASTIC CONTAINERS

Alfred Flack, New Hyde Park, N.Y., assignor, by mesne assignments, to Lily-Tulip Cup Corporation, New York, N.Y., a corporation of Delaware Application May 18, 1956, Serial No. 585,841

5 Claims. (Cl. 220—97)

This invention relates to nestable plastic containers and more especially to molded or formed plastic containers adapted to receive snap-over covers.

In the packaging of foods and other commodities where it is desirable to view the contents of the package it has been found desirable to use containers made of transparent plastics, preferably adapted to receive a plastic lid or cover. In order to economize in shipping and storage space such containers are advantageously of the nestable type. Prior to this invention nestable plastic containers presented certain undesirable characteristics. They could not nest compactly; they required too much plastic material to obtain the desired strength and hence were too costly; and the required thickness of the material made visibility through semi-transparent material difficult, if not impossible.

In accordance with the present invention a new and improved nestable plastic container adapted to receive a snap-on lid is provided, which is formed and constructed in a manner to enable economic manufacture because of the lesser total amount of material required while providing sufficient strength and compact nesting, and which because of the thinness of the wall provides satisfactory visibility even when made of semi-transparent plastic material.

Various further and more specific objects, features and advantages of the invention will appear from the description given below taken in connection with the accompanying drawing, illustrating by way of example the preferred form of the invention. The invention consists in such novel features and combinations as may be shown and described in connection with the example of the invention herein disclosed.

In the drawing:

Fig. 1 is a side elevational view in cross section of a nestable plastic container constructed in accordance with the present invention;

Fig. 2 is a similar view showing greatly enlarged segments of the container shown in Fig. 1 in nested condition; and Fig. 3 is a slightly enlarged segmental view of the upper end of the container as shown in Fig. 1 showing its use in conjunction with a snap-on lid.

Referring to Figs. 1 and 2: the container is designated in its entirety as C and comprises unitarily formed bottom and side wall portions generally designated as B and W respectively. The container is formed, as by injection molding or by forming from a suitable plastic material such as polystyrene or impact polystyrene or polyethylene. While the container C is shown in the present embodiment as having a generally frustro-conical shape, it will be understood that the invention is equally applicable to tapered containers having cross-sectional shapes other than circular, e.g., square, oval, etc.

The side wall W comprises an upwardly and outwardly tapred portion 1, preferably of frustro-conical shape and in the present embodiment tapered 5° on a side, extending upwardly from the bottom B to adjacent the upper open end of the container. At the upper end of the tapered portion 1 the side wall is provided with a substantially horizontally outwardly extending circumferentially continuous first shoulder 2 presenting a sharply defined outer edge 3 from which the side wall extends upwardly to define a substantially cylindrical neck portion 4. At the upper end of the neck portion 4 the side wall is provided with a circumferentially continuous second shoulder 5 extending substantially horizontally outward presenting a sharply defined inner edge 6 and having at its outer edge a generally cylindrical rim 7. Preferably the container bottom B is slightly concave and is provided with a slight annular bead 8 to provide a suitable base.

In view of the combined stiffening structure at the open end of the container, comprising the outwardly extending shoulders 2 and 5 in cooperative association with the cylindrical portions 4 and 7, it is possible to utilize an exceptionally thin side wall and bottom of substantially uniform thickness throughout. Except for the slight bottom bead 8, the entire container from the upper edge of the rim 7 throughout the peripheral and length of the side wall W and bottom B has a substantially uniform thickness. For example, an entirely satisfactory container embodying the invention has been made with a thickness of about .018 inch held within the limits of .017–.020 inch.

In order to obtain optimum nesting the length of the cylindrical neck 4 should be of the order of seventeen times the thickness, so for a thickness of .018 inch a neck 4 having a length of 5/16 inch has been found entirely satisfactory. As will be seen from Fig. 2, the sharply defined outer edge 3 of the shoulder 2 and the sharply defined inner edge 6 of the shoulder 5 facilitates accurate engagement and register of successively nested containers, the outer diameter of shoulder 2 being slightly greater than the inner diameter of shoulder 5. On the other hand, shoulder 5 extends outwardly a substantially greater distance for the dual purpose of adding stiffness and to space the rim lip 7 outwardly to facilitate the grasping and removal of a snap-on closure lid such as 9 (Fig. 3) which is preferably also made of plastic. It will be noted in this respect that there is sufficient conjoint flexibility of the container rim 7 and closure lid flange 10 to allow the bead 11 of the lid to snap over and beneath the rim 7 of the container and thereafter firmly lock the lid in position while permitting ready removal.

While the invention has been described in particularity with reference to the preferred form thereof, it readily will be understood by those skilled in the art after understanding the invention that further modifications and changes may be made therein without departing from the spirit and scope of the invention, as defined by the claims appended hereto.

What is claimed as new and desired to be secured by Letters Patent of the United States is:

1. A plastic nestable container having a slightly tapered side wall extending upwardly from a bottom at its small end to adjacent its open end where it is provided with a peripherally continuous outwardly extending first shoulder presenting a sharply defined outer edge and a substantially vertical neck extending upwardly therefrom and provided at its upper end with a peripherally continuous outwardly extending second shoulder presenting a sharply defined inner edge and having at its outer edge an upwardly extending substantially vertical rim portion for receiving a closure lid, the outer diameter of the first shoulder being slightly greater than the inner diameter of said neck portion at said second shoulder and said second shoulder being of a diameter substantially greater than said first shoulder, the thickness of said side wall throughout its periphery being substantially uniform from the upper edge of its rim portion downwardly throughout the major length of its tapered portion.

2. A plastic nestable container having a slightly tapered side wall extending upwardly from a bottom at its small end to adjacent its open end where it is provided with a peripherally continuous outwardly extending first shoulder presenting a sharply defined outer edge and a substantially vertical neck extending upwardly therefrom and provided at its upper end with a peripherally continuous outwardly extending second shoulder presenting a sharply defined inner edge and having at its outer edge an upwardly extending substantially vertical rim portion for receiving a closure lid, the outer diameter of the first shoulder being slightly greater than the inner diameter of said neck portion at said second shoulder and said second shoulder being of a diameter substantially greater than said first shoulder, the thickness of said side wall throughout its periphery being substantially uniform from the upper edge of its rim portion to the small end of its tapered portion.

3. A plastic nestable container having a slightly tapered side wall extending upwardly from a bottom at its small end to adjacent its open end where it is provided with a peripherally continuous outwardly extending first shoulder presenting a sharply defined outer edge and a substantially vertical neck extending upwardly therefrom and provided at its upper end with a peripherally continuous outwardly extending second shoulder presenting a sharply defined inner edge and having at its outer edge an upwardly extending substantially vertical rim portion for receiving a closure lid, the outer diameter of the first shoulder being slightly greater than the inner diameter of said neck portion at said second shoulder and said second shoulder a diameter substantially greater than said first shoulder, the thickness of said side wall throughout its periphery being substantially uniform from the upper edge of its rim portion downwardly throughout the major length of its tapered portion, said neck portion being of a height of the order of seventeen times the wall thickness.

4. A molded plastic nestable container having a slightly tapered side wall extending upwardly from a bottom at its small end to adjacent its open end where it is provided with a peripherally continuous outwardly extending first shoulder presenting a sharply defined outer edge and a substantially vertical neck extending upwardly therefrom and provided at its upper end with a peripherally continuous outwardly extending second shoulder presenting a sharply defined inner edge and having at its outer edge an upwardly extending substantially vertical rim portion for receiving a closure lid, the outer diameter of the first shoulder being slightly greater than the inner diameter of said neck portion at said second shoulder and said second shoulder being of a diameter substantially greater than said first shoulder, said side wall having a substantially uniform thickness of the order of .017–.020 inch throughout its periphery from the upper edge of its rim portion downwardly throughout substantially the full extent of the tapered portion.

5. A molded plastic nestable container having a slightly tapered side wall extending upwardly from a bottom at its small end to adjacent its open end where it is provided with a peripherally continuous outwardly extending first shoulder presenting a sharply defined outer edge and a substantially vertical neck extending upwardly therefrom and provided at its upper end with a peripherally continuous outwardly extending second shoulder presenting a sharply defined inner edge and having an upwardly extending substantially vertical rim portion at its outer edge for receiving a closure lid, the outer diameter of the first shoulder being slightly greater than the inner diameter of said neck portion at said second shoulder and said second shoulder being of a diameter substantially greater than said first shoulder, the said container throughout the entire side wall and substantially the entire bottom being substantially uniform in thickness.

References Cited in the file of this patent

UNITED STATES PATENTS

| | | |
|---|---|---|
| 112,477 | Merrill | Mar. 7, 1871 |
| 2,420,215 | Wiley | May 6, 1947 |
| 2,497,870 | Dennis | Feb. 21, 1950 |
| 2,606,586 | Hill | Aug. 12, 1952 |
| 2,707,588 | Amberg | May 3, 1955 |

FOREIGN PATENTS

| | | |
|---|---|---|
| 134,201 | Austria | July 25, 1933 |
| 494,442 | Canada | July 14, 1953 |